(Model.)
J. F. BOHLER.
Bolster Spring.
No. 239,082. Patented March 22, 1881.
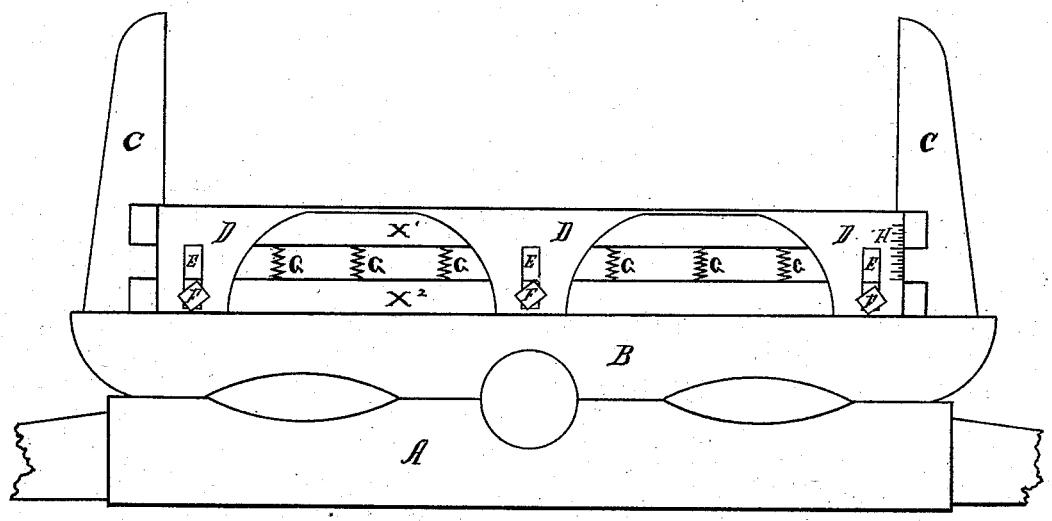
Attest:
A. B. McCool
Geo. T. Moyer
Inventor:
John F. Bohler.
By McCool
Attorney.

UNITED STATES PATENT OFFICE.

JOHN F. BOHLER, OF POTTSVILLE, PENNSYLVANIA.

BOLSTER-SPRING.

SPECIFICATION forming part of Letters Patent No. 239,082, dated March 22, 1881.

Application filed November 30, 1880. (Model.)

*To all whom it may concern:*

Be it known that I, JOHN F. BOHLER, of Pottsville, in the county of Schuylkill and State of Pennsylvania, have invented a new and useful Improvement in Bolster-Springs, of which the following is a specification.

My invention relates to improvements in bolster-springs for use on wheeled vehicles; and its objects are to provide a spring for the body of the vehicle to rest on, to enable a fragile load to be carried with comparative safety, and to convert the vehicle into a spring or common truck vehicle easily and speedily. I attain these objects by means of the device shown in the accompanying drawing, in which the figure is a front elevation of a wagon axle and bolster with the spring thereon.

A represents the axle of an ordinary truck-wagon, B the bolster, and C C the standards, the bolster-spring resting on the bolster and between the standards.

I construct my invention by making two bars of wood or metal, $X'$ $X^2$. Over the top bar, $X'$, I form a metal plate, D D D, having the slots E E E. The bolts F F F pass through the lower bar, $X^2$, and through the slots E E E. Between the bars $X'$ and $X^2$, I place a number of spiral springs, G G G G. When a load is placed on the top of the bolster-spring the bar $X'$ will be pressed down and the springs will be compressed according to the weight upon them. The bolts F F F serve to hold the parts together, and in sliding or pressing downward of the top bar, $X'$, having the plate D D D attached, the bolts act as a guide, the slots E E E being constructed sufficiently large to enable the plate D D D to pass the bolts readily.

It will be readily seen that my bolster-spring is not attached rigidly either to the bolster or body of the vehicle, but can be removed easily. It enables a wagon to be converted into a spring or truck wagon at will and in a few minutes. It increases the durability of ordinary vehicles, inasmuch as its use prevents the jarring and jolting usual with such vehicles.

At one side of the plate D D D, at H, I mark a scale, the object of which is to show the weight on the bolster-spring, or the load on the wagon. As the springs are depressed by the load the scale will show the weight.

What I claim is—

In a bolster-spring constructed as shown and described, the combination of the bars $X'$ $X^2$, having the plate D D D, with slots E E E, bolts F F F, springs G G G G, and scale H, as and for the purposes set forth.

JOHN F. BOHLER.

Witnesses:
J. H. FISTER,
MORGAN REED.